United States Patent [19]

Enomoto et al.

[11] Patent Number: 5,273,941

[45] Date of Patent: Dec. 28, 1993

[54] FIBER REINFORCED SILICON CARBIDE CERAMICS AND METHOD OF PRODUCING THE SAME

[75] Inventors: Ryo Enomoto; Yoshimi Matsuno; Masato Yokoi, all of Ogaki, Japan

[73] Assignee: Ibiden Co., Ltd., Gifu, Japan

[21] Appl. No.: 415,311

[22] PCT Filed: Jan. 30, 1989

[86] PCT No.: PCT/JP89/00091

§ 371 Date: Sep. 27, 1989

§ 102(e) Date: Sep. 27, 1989

[30] Foreign Application Priority Data

Jan. 30, 1988 [JP] Japan ................. 63-18567
Aug. 29, 1988 [JP] Japan ................. 63-212546

[51] Int. Cl.$^5$ ........................... C04J 35/56
[52] U.S. Cl. ............................. 501/88; 264/63; 264/332
[58] Field of Search ............ 501/90, 95; 528/14; 264/63, 332

[56] References Cited

U.S. PATENT DOCUMENTS

| | | | |
|---|---|---|---|
| 4,395,460 | 7/1983 | Gaul, Jr. | 428/408 |
| 4,404,153 | 9/1983 | Gaul, Jr. | 264/29.2 |
| 4,618,591 | 10/1986 | Okamura et al. | 501/90 |
| 4,837,230 | 6/1989 | Chen et al. | 501/88 |
| 4,885,265 | 12/1989 | Hillig et al. | 501/95 |
| 4,923,829 | 5/1990 | Yasutomi et al. | 501/95 |

FOREIGN PATENT DOCUMENTS

| | | |
|---|---|---|
| 52-81309 | 7/1977 | Japan . |
| 52-149895 | 12/1977 | Japan . |
| 57-77075 | 5/1982 | Japan . |
| 7135776 | 8/1982 | Japan . |
| 58-91061 | 5/1983 | Japan . |
| 58-145668 | 8/1983 | Japan . |
| 59-219 | 1/1984 | Japan . |
| 59-57971 | 4/1984 | Japan . |
| 60-137849 | 7/1985 | Japan . |
| 60-54906 | 12/1985 | Japan . |
| 61-41876 | 9/1986 | Japan . |
| 61-291460 | 12/1986 | Japan . |
| 62-12671 | 1/1987 | Japan . |
| 62-187142 | 8/1987 | Japan . |
| 62-230680 | 10/1987 | Japan . |
| 62-260778 | 11/1987 | Japan . |
| 2297267 | 12/1987 | Japan . |

OTHER PUBLICATIONS

Iida, et al., "Fiber Reinforced Apatite Through Pressurized Sintering So As to Orient Mild Carbon Fibers Into Long Axis Direction", Association of Japan Ceramics, Abstract Collection for Forum, Item No. 3G09, 1987

Matsubara, et al., "The Abstract Collection for Seventh Basic Forum of High Temperature Materials", Association of Japan Ceramics, pp. 14-19, 1987.

Wada, et al., "Ceramic Fiber Reinforced Ceramics", Toyota Central Research & Development Labs., Research & Development Review, vol. 20, No. 3/4, 1986.

*Primary Examiner*—Mark L. Bell
*Assistant Examiner*—A. Wright
*Attorney, Agent, or Firm*—Sandler Greenblum & Bernstein

[57] ABSTRACT

It relates to fiber reinforced silicon carbide ceramics in which heat-resistant inorganic short fibers such as flawless SiC or $Si_3N_4$ are three-dimensionally dispersed in a matrix composed of silicon carbide and entangled with each other to form a high strength shaped body as well as a method of producing the same. Further, it relates to high density silicon carbide ceramica in which metallic silicon is filled in pores of the shaped body, so that these fiber reinforced silicon carbide ceramics possesses both high strength and high toughness and are composite ceramics suitable as a heat-resistant structural material or a material with bio hard texture.

13 Claims, No Drawings

FIBER REINFORCED SILICON CARBIDE CERAMICS AND METHOD OF PRODUCING THE SAME

BACKGROUND OF THE INVENTION

1. Field of The Invention

This invention relates to fiber reinforced silicon carbide ceramics, and more particularly to fiber reinforced silicon carbide ceramics having improved strength and toughness and suitability as a heat-resistant structural material, wherein heat-resistant inorganic short fibers having no damage are three-dimensionally and uniformly dispersed into a matrix composed of silicon carbide to form a shaped body containing these heat-resistant inorganic short fibers entangled with each other, as well as a method of producing the same.

2. Description of Relevant Materials

As a new application of the ceramic, it has recently been examined for use in heat-resistant structural materials and materials for bio hard texture. In such applications, however, there is a basic problem in that the ceramics lack strength and toughness.

Heretofore, fiber reinforced ceramics obtained by adding fibers to the ceramic, has been proposed for overcoming this problem. For example, $Al_2O_3$-SiC whisker composite material is known as a typical fiber reinforced ceramic. The mechanical properties of such a composite material are fully discussed in a study by Matsubara, Okuno, Watanabe, Matsuo et al. (Association of Japan Ceramics, the abstract collection for 7th basic forum of high temperature material, pp. 14~19).

Further, a method of producing ceramic composite materials by reinforcing silicon carbide ceramic with fibers has been proposed in Japanese Patent laid open No. 52-81309, Japanese Patent laid open No. 58-145668 and Japanese Patent laid open No. 62-12671. Also various "ceramic fiber reinforced ceramics" have been disclosed in "Toyota Central Res. & Develop. Labs., R & D Review" (vol. 20, No. 3/4 1986).

In the aforementioned conventional techniques, ceramics having somewhat improved toughness are obtained. However, there are not yet developed fiber reinforced ceramics satisfying conditions required of a structural material or a material with bio hard texture such as artificial bone or artificial tooth root, i.e. ceramics having excellent toughness and strength.

In the fiber reinforced ceramics produced by these conventional techniques, the green body is shaped using a dry shaping method, or the relatively low-density green shaped body is highly densified by pressure sintering, so that the heat-resistant inorganic fibers such as whickers or the like are considerably deformed or even broken in an extreme case. As a result, the toughness and the strength are not so improved though the heat-resistant inorganic fibers are compositely added.

Further, in the above conventional technique, there is a tendency for the heat-resistant inorganic fibers to be oriented in a two-dimensional direction, so that anisotropy is caused in the strength and consequently there is a problem in that the anisotropy should be considered in use of the ceramics.

An object of the invention is to solve and overcome the problems inherent in the known fiber reinforced ceramics, among the various problems in the aforementioned ceramic reinforcing techniques.

SUMMARY OF THE INVENTION

Applicants have made various studies with respect to fiber reinforced silicon carbide ceramics having excellent strength and toughness capable of solving the aforementioned drawbacks of the conventional technique as well as the production technique thereof. Applicants and developed new ceramics and a method of producing same having the following characteristics.

The fiber reinforced silicon carbide ceramic according to the invention is firstly a composite ceramic in which heat-resistant, inorganic short fibers are three-dimensionally and uniformly dispersed in a matrix made from silicon carbide, and at least a part of the matrix is composed of silicon carbide produced in heat treatment of silicon carbide precursor.

Secondly, the fiber reinforced silicon carbide ceramic according to the invention is a composite ceramic consisting of silicon carbide and heat-resistant inorganic short fibers in which metallic silicon fills in pores created in the production of the ceramic.

Thirdly, the invention proposes a method of producing fiber reinforced silicon carbide ceramics, which comprises:
(1) a step of wet mixing fine powder of silicon carbide with heat-resistant inorganic short fibers and shaping the mixture to form a green shaped body;
(2) a step of impregnating the green shaped body with a solution of silicon carbide precursor and drying it to form a preliminary shaped body; and
(3) a step of heat treating the preliminary shaped body produced in the above step at a temperature of 800°~1700° C.

Fourthly, the invention proposes a method of producing fiber reinforced silicon carbide ceramics in which metallic silicon is filled in a shaped body, which comprises:
(1) a step of wet mixing fine powder of silicon carbide with heat-resistant inorganic short fibers and shaping the mixture to form a green shaped body;
(2) a step of impregnating the green shaped body with a solution of silicon carbide precursor and drying it to form a preliminary shaped body;
(3) a step of heat treating the preliminary shaped body produced in the above step (2) at a temperature of 800°~1700° C.; and
(4) a step of filling metallic silicon in pores remaining in the shaped body at the heat treatment of the above step (3) or after the heat treatment.

DETAILED DESCRIPTION OF THE INVENTION

In the fiber reinforced silicon carbide ceramics obtained to the invention, the heat-resistant inorganic short fibers compositely added to the matrix are not damaged, and the heat-resistant, inorganic short fibers are three-dimensionally and uniformly dispersed in the matrix made of silicon carbide. This fibers exist in an entangled state with each other, so that high density shaped bodies strongly bonding these fibers can be produced. Further, the fiber reinforced silicon carbide ceramics having excellent toughness, in addition to strength, and can easily be produced.

In the invention as mentioned above, at least a part of the matrix, made from silicon carbide, in the fiber reinforced silicon carbide ceramic is occupied with silicon carbide produced by impregnating the solution of silicon carbide precursor in pores of the green shaped body, drying the body and then subjecting it a heat treatment.

The matrix is formed with the fine power, as well as silicone carbide produced from the precursor, to render a high density green shaped body. Thus, even if the heat treatment is carried out under pressure, the large shrinkage from the heat treatment is eliminated, and consequently the considerable deformation or breakage of the heat-resistant short inorganic fibers is prevented. Furthermore, the invention is convenient for obtaining the ceramic having a very excellent adhesion property between the inorganic short fiber and the matrix, in addition to the high density.

Such fiber reinforced silicon carbide ceramics according to the invention are desired to have a porosity of not more porosity than 30%, particularly not more than 10%.

The fiber reinforced silicon carbide ceramics according to the invention have excellent strength and toughness. The flexural strength measured according to JIS R-1601 is not less than 400 MPa and the value of rupture toughness measured by an indentation method and calculated according to Niihara's equation is not less than 5 MPa·m$^{\frac{1}{2}}$.

Furthermore, in the fiber reinforced silicon carbide ceramics according to the invention, the heat-resistant inorganic short fibers are three-dimensional and uniformly dispersed in the matrix composed of silicon carbide, so that the strength and toughness have no anisotropy, there is thus no need to consider the anisotropy when using the ceramics.

In the fiber reinforced silicon carbide ceramics according to the invention, the content of the heat-resistant inorganic short fibers contained in the matrix is preferable 1~45 vol %. This is because when the fiber content is less than 1 vol %, there is no effect on substantially enhancing the strength and toughness while when the fiber content exceeds 45 vol %, the ability to uniformly disperse of the heat-resistant inorganic short fiber into the matrix composed of silicon carbide lowers and thereby decreases the strength and toughness. The more preferable range is 5~25 vol %.

As to the heat-resistant inorganic short fiber, it is preferable to have an average length of not more than 10 mm and an average aspect ratio of 10~10000. Examples of the fibers used include at least one selected from the group consisting of whiskers or chopped fibers of SiC, $Si_3N_4$, $ZrO_2$, $Al_2O_3$, $SiO_2$, carbon, silica-alumina and the like.

The second embodiment proposed by the invention is a fiber reinforced silicon carbide ceramic, wherein metallic silicon is filled in the remaining pores of the shaped body which consists of the fiber reinforced silicon carbide ceramic, to improve the property density of the shaped body.

The method of producing the aforementioned fiber reinforced silicon carbide ceramics according to the invention will be described in detail below.

The invention is characterized by fundamentally having three steps.

The first step is a step of wet mixing silicon carbide fine powder with heat-resistant inorganic short fibers and shaping them to form a green shaped body.

In this step, the silicon carbide fine powder is preferred to have an average particle size of not more than 3 μm, more particularly not more than 1 μm. Moreover, a sintering aid may be added to the silicon carbide fine powder.

The heat-resistant inorganic short fiber is preferred to have an average length of not more than 10 mm and an average aspect ratio of 10~10000. For example, use may be made of at least one selected from the group consisting of whiskers or chopped fibers of SiC, $Si_3N_4$, $ZrO_2$, $Al_2O_3$, $SiO_2$, carbon, silica-alumina and the like.

As to the heat-resistant inorganic short fiber, according to the invention, it is advantageous to use fiber previously subjected to a surface treatment in order to provide a good adhesion property to silicon carbide produced from the solution of silicon carbide precursor. As the surface treatment, it is effective to subject the fibers to a coating treatment for carbon, carbide ceramics, silicide ceramics, boride ceramics or the like by a method of treating through silane coupling, a method of heat treating in various ags atmospheres or a method of immersing in various metal alkoxide solutions and then performing a heat treatment.

According to the invention, the silicon carbide fine powder is wet mixed with the heat-resistant inorganic short fibers for uniformly dispersing and mixing them. In the wet mixing, water or various organic solvents are used as a dispersing medium. As the wet mixing method, a method to causing no damage of the fibers, as far as possible, is preferable. For example, there are adapted means such as high speed mixer, ball mill, supersonic disperser and the like.

It is preferable that the amount of silicon carbide fine powder contained in the wet mixed mixture is 5~35% by weight and the amount of the heat-resistant inorganic short fiber is 1~15% by weight. If necessary, a binder, a dispersing agent and the like as mentioned later may be added to this mixture and, further an agglomerating agent may be added after the uniform dispersion of the fibers.

Use may be made of at least one substance acting as a binder selected from the group consisting of organic binders such as polyacrylate, polymethyl methacrylate, polyvinyl alcohol, polyvinyl butyral, polyethylene oxide, polymethacrylate, methyl cellulose, urethane and the like; and solutions of various ceramic precursors. As the dispersing agent, use may be made of at least one substance selected from the group consisting of triolein, methyl oleate, natural fish oil, synthetic surfactant, benzene sulfonic acid, allyl sulfonic acid, phosphate, polycarboxylic acid, ammonia and the like.

Further, at least one substance selected from the group consisting of polyacrylamide, polymethylacrylate, aluminum sulfate, polyaluminum chloride and the like is used as the agglomerating agent.

Then, the above prepared mixture is shaped to form a green shaped body at this step.

As the method of shaping the mixture, there may be applied, for example, a dry shaping in which the mixture, after the removal of dispersing medium, is dried and shaped by pressing; or a wet shaping such as asshaping in which the mixture is shaped at a wet state, a cast shaping or the like. However, when the starting material is obtained by previously wet mixing the silicon carbide fine powder with the heat-resistant inorganic short fibers and then drying them, it is not preferable to apply the dry shaping through pressing. Since such a starting material is at a state of secondary particle consisting of the mixture of silicon carbide fine powder and heat-resistant inorganic fiber, even when the starting material is shaped by pressing, grain boundary not continuously entangling the fibers with each other remains between the secondary particles in the shaped body. That is, such a grain boundary renders into a source for generating the breakage, which is not related to the improvement of toughness and strength tough the heat-resistant inorganic fiber is added.

On the contrary, the wet shaping is preferable because the heat-resistant inorganic short fibers are hardly damaged and these fibers are liable to be three-dimensionally and uniformly dispersed to form a shaped body at such a state that the fibers are continuously entangled with each other in the shaped body. As such a wet shaping method, there are an as-shaping, a cast shaping and the like, and among them the as-shaping method is particularly preferable.

Moreover, in the above step, the shaped body obtained by the wet shaping may be subjected to a pressing such as rubber pressing or the like within a range of not damaging the heat-resistant inorganic short fibers before the drying or after the drying in order to increase the density.

The resulting green shaped body may further be dried or calcined in air or in a nitrogen gas or inert gas atmosphere. In this case, the drying or calcining is to merely hold the shaped body.

The thus obtained green shaped body is preferable to contain 1~45 vol %, more particularly 3~25 vol % of the heat-resistant inorganic short fiber. This content range of the heat-resistant inorganic short fiber is favorable for providing very excellent strength and toughness in the finally produced fiber reinforced silicon carbide ceramic.

Then, the above step (2) is a stage that a preliminary shaped body is prepared by impregnating a solution of silicon carbide precursor in the green shaped body and then drying it.

The reason whey the green shaped body is impregnated with the solution of silicon carbide precursor and then dried is due to the fact that the silicon carbide precursor is filled in the pores of the shaped body by drying to prevent the deformation or brekage of the heat-resistant inorganic short fibers in the shaped body. And also, the shaped body can be highly densified before the firing. Further, the adhesion property to the matrix is excellent, so that fiber reinforced silicon carbide ceramics having very excellent strength and toughness can be obtained. Moreover, when the subsequent heat treatment is carried out under a pressure, the shrinkage in the heat treatment is lessened, and the deformation or breakage of the heat-resistant inorganic short fiber can be suppressed as far as possible.

The solution of silicon carbide precursor used in this step is a solution producing silicon carbide by drying or heat treatment. For example, it is a solution of at least one organic solvent selected from polycarbosilane, polysilane and polysilastyrene.

It is preferable that the silicon carbide precursor solution produces silicon carbide of 10~60% by weight as converted into silicon carbide by the drying or the heat treatment. Further, the viscosity is favorable to be 10~5000 cP.

According to the invention, the treatment that the green shaped body obtained by shaping the above mixture is impregnated with the silicon carbide precursor solution and then dried is carried out at least one times, whereby it is preferable to render the porosity of the preliminary shaped body into not more than 40%, more particularly not more than 25%.

The reason why the porosity of the preliminary shaped body is not more than 40% as mentioned above is due to the fact that when the porosity is more than 40%, it is difficult to increase the density by the subsequent heat treatment, and when the heat treatment is carried out under a pressure, the shrinkage becomes considerably large and hence the added heat-resistant inorganic short fibers are apt to be damaged and consequently it is difficult to produce the fiber reinforced silicon carbide ceramics having high strength and very excellent toughness.

Moreover, in the step (2), after the green shaped body is impregnated with the silicon carbide precursor solution and then dried, the calcining may further be performed, or the treatment of impregantion, drying and calcining may be repeated.

Next, the step (3) is a step wherein the preliminary shaped body obtained by the treatment of the above step (2) is heat treated at a temperature of 800°~1700° C. In this step (3), the silicon carbide fine powder, heat-resistant inorganic short fibers and silicon carbide produced from the silicon carbide precursor solution are mutually and strongly bonded with each other.

The reason whey the heat treatment is carried at a temperature of 800°~1700° C. is that when it is lower than 800° C., the conversion of silicon carbide precursor into silicon carbide through thermal decomposition is insufficient and it is difficult to increase the density, while when it is higher than 1700° C., the crystallization of silicon carbide produced from the silicon carbide precursor and the degradation of the heat-resistant inorganic short fiber becomes remarkable and the strength lowers.

This heat treatment may be carried out under atmospheric pressure or under a pressure. However, to obtain fiber reinforced silicon carbide ceramics having high density and excellent strength and toughness, by reducing the remaining pores at a low temperature in a short time to restrain crystal growth, it is advantageous to conduct the heat treatment under a pressure. As a pressurization method, it is desirable to apply uniaxial pressure, hydrostatic pressure or the like. As the atmosphere in the heat treatment, use may be made of air, steam, nitrogen gas, inert gas and the like.

According to the invention, the above steps two and the step three may be repeated.

The reason that the fiber reinforced silicon carbide ceramics having excellent strength and toughness, as mentioned above, can be produced according to the invention is considered as follows. Firstly, the shaping is performed after the the silicon carbide fine powder is wet mixed with the heat-resistant inorganic short fibers. That is, the green shaped body having a structure in which the heat-resistant inorganic short fibers are three-dimensionally and very uniformly dispersed without orienting in a particular direction can be formed by the wet mixing. Secondly, the green shaped body is subjected to impregnation with the silicon carbide precursor and drying or, further, subsequent calcining treatment. The filling of silicon carbide in the the pores of the green shaped body can be used to increase the density by such a treatment. Further, when the subsequent firing method under a pressure is adopted, not only can the production be performed at a low temperature in a short time, but also high density fiber reinforced silicon carbide ceramics having a small crystal grain size can advantageously be produced without damaging the heat-resistant inorganic short fibers during the production.

The second method proposed according to the invention is characterized by a treatment of filling metallic silicon in pores remaining in the preliminary shaped body at the heat treatment of above step three or after the heat treatment. As a result, fiber reinforced silicon carbide ceramics in which the metallic silicon is filled in the pores of the shaped body consisting of silicon carbide and heat-resistant inorganic short fiber are produced.

As to the treatment of filling the metallic silicon, it is advantageous to use a method of pumping silicon melt into the pores of the shaped body, and a method of immersing a part of the shaped body in a vacuum impregnated silicon melt, charged in silicon melt under a vacuum to utilize capillarity. In brief, the fiber reinforced silicon carbide ceramic is rendered into a high density composite body by this treatment, and the obtained composite ceramic is particularly a fiber reinforced silicon carbide ceramic having excellent toughness.

As silicon used in this treatment, use may be made of metallic silicon.

BEST MODE OF CARRYING OUT THE INVENTION

Example 1

(1) In a ball mill were mixed 100 parts by weight of silicon carbide fine powder having an average gain size of 0.3 $\mu$m, 18 parts by weight of SiC whisker having an average length of 46 $\mu$m and an average aspect ratio of 153, 5 parts by weight of polyethylene oxide, 375 parts by weight of water and 0.5 parts by weight of 1N ammonia water for 5 hours to form a slurry.

(2) Then, the slurry was poured into a mold provided with a screen having an opening of 0.04 mm, filtered by suction, dried, rubber pressed under a surface pressure of 3 t/cm$^2$ and then fired at a temperature of 1300° C. for 2 hours to form a green shaped body.

(3) The green shaped body obtained in the above step (2) was impregnated with a solution of silicon carbide precursor, obtained by dissolving 10 parts by weight of polycarbosilane in 90 parts by weight of hexane, and then dried to form a preliminary shaped body. Thereafter, the preliminary shaped body was heat treated in an argon gas atmosphere at 1300° C. for 5 hours to obtain a shaped body.

(4) Then, the treatment of impregnating with a solution of silicon carbide precursor obtained by dissolving 55 parts by weight of polycarbosilane in 45 parts by weight of hexane, drying and heat treating in an argon gas atmosphere at 1300° C. for 5 hours was repeated 10 times upon the shaped body obtained in the above step (3).

(5) The shaped body obtained in the above step (4) was further subjected to a heat treatment in an argon gas atmosphere at 1500° C. for 12 hours to produce a fiber reinforced silicon carbide ceramic.

The thus obtained fiber reinforced silicon carbide ceramic had a porosity of 7.8%, a flexural strength of 860 MPa as measured according to JIS-R1601 and a rupture toughness value of 6.9 MPa.m$^{\frac{1}{2}}$ as measured by an indentation method and calculated from Niihara's equation, and had been confirmed to have high strength and toughness required as a heat-resistant structural material.

Example 2

In this example, the same procedure as in Example 1 was repeated, except that the steps of impregnation, drying and heat treatment at step (4) of Example 1 were repeated 6 times, to obtain a shaped body having a porosity of 23.3%. Thereafter, the shaped body was heat treated in an argon gas atmosphere at 1600° C. under a pressure of 400 kgf/cm$^2$ for 1 hour to obtain a fiber reinforced silicon carbide ceramic.

The thus obtained fiber reinforced silicon carbide ceramic had a porosity of 2.3% and a flexural strength and a rupture toughness value of 980 MPa and 6.1 MPa·m$^{\frac{1}{2}}$ as measured by the same methods as in Example 1, respectively, and was a fiber reinforced silicon carbide ceramic having high strength and toughness required as a heat-resistant structural material.

Example 3

In this example, the same procedure as in Example 1 was repeated, except that the steps of impregnation, drying and heat treatment at step (4) of Example 1 were repeated 8 times, to obtain a shaped body having a porosity of 14.2%. Thereafter, the shaped body was heat treated in an argon gas atmosphere at 1500° C. for 12 hours to obtain a fiber reinforced silicon carbide ceramic.

Then, the thus obtained fiber reinforced silicon carbide ceramic was placed in mold heated to 1500° C., and a silicon melt fused at 1500° C. was poured into the mold, and the silicon melt was filled in pores of the above fiber reinforced silicon carbide ceramic under a pressure of 1 ton/cm$^2$, which was then cooled to obtain a fiber reinforced silicon carbide ceramic.

This fiber reinforced silicon carbide ceramic had a porosity of 0.3% and a flexural strength and a rupture toughness value of 960 MPa and 8.9 MPa·m$^{\frac{1}{2}}$ as measured by the same methods as in Example 1, respectively, and was confirmed to be a fiber reinforced silicon carbide ceramic having high strength and toughness required as a heat-resistant structural material.

Example 4

(1) In a ball mill were mixed 100 parts by weight of silicon carbide fine powder having an average grain size of 0.3 $\mu$m, 18 parts by weight of SiC whisker having an average length of 46 $\mu$m and an average aspect ratio of 153, 5 parts by weight of polyethylene oxide, 375 parts by weight of water and 0.5 part by weight of 1N ammonia water for 5 hours to prepare a slurry.

To 100 parts by weight of the mixed slurry was added 32 parts by weight of polyacrylamide series agglomerating agent (solid content 0.04% by weight).

(2) By using the slurry containing the above agglomerating agent was produced a fiber reinforced silicon carbide ceramic in the same manner as in Example 1.

The thus obtained fiber reinforced silicon carbide ceramic had a porosity of 5.5% and a flexural strength and rupture toughness value of 915 MPa and 6.0 MPa·m$^{\frac{1}{2}}$ respectively as measured by the same methods as in Example 1, and was a fiber reinforced silicon carbide ceramic having high strength and toughness required as a heat-resistant structural material.

Example 5

In this example, the same procedure as in Example 1 was repeated, except that the rubber pressing in the step two of Example 1 was omitted and the heat treatment in the step five of Example 1 was carried out in an argon gas atmosphere at 1600° C. under a pressure, to obtain a fiber reinforced silicon carbide ceramic.

The thus obtained fiber reinforced silicon carbide ceramic had a porosity of 3.5% and a flexural strength and a rupture toughness value of 950 MPa and 6.1 MPa·m$^{\frac{1}{2}}$ respectively as measured by the same methods as in Example 1, and was a fiber reinforced silicon carbide ceramic having high strength and toughness required as a heat-resistant structural material.

Example 6

(1) In a ball mill were mixed 100 parts by weight of silicon carbide fine powder having an average grain size of 0.3 μm, 0.5 parts by weight of boron carbide powder having a specific surface area of 27.8 m$^2$/g, 4 parts by weight of novolak type phenolic resin (fixed carbon content 51.6% by weight), 18 parts by weight of SiC whisker having an average length of 46 μm and an average aspect ratio of 153, 10 parts by weight of polycarbosilane and 375 parts by weight of hexane for 5 hours to prepare a slurry.

(2) By using the above mixed slurry a fiber reinforced silicon carbide ceramic was produced in the same manner as in Example 1.

The thus obtained fiber reinforced silicon carbide ceramic had a porosity of 5.5% and a flexural strength and a rupture toughness value of 910 MPa and 6.1 MPa·m$^{\frac{1}{2}}$ respectively as measured by the same methods as in Example 1, and was a fiber reinforced silicon carbide ceramic having high strength and toughness required as a heat-resistant structural material.

Example 7

(1) In a ball mill were mixed 100 parts by weight of silicon carbide fine powder having an average grain size of 0.3 μm, 18 parts by weight of Si$_3$N$_4$ whisker having an average length of 100 μm and an average aspect ratio of 110, 5 parts by weight of polyethylene oxide, 375 parts by weight of water and 0.5 parts by weight of 1N ammonia water for 5 hours to prepare a slurry.

(2) The mixed slurry was subjected to the steps two and three of Example 1 to form a shaped body.

(3) Then, the shaped body obtained in the above step two was impregnated with a solution of silicon carbide precursor, created by dissolving 55 parts by weight of polycarbosilane in 45 parts by weight of hexane, dried and subjected to a heat treatment in an argon gas atmosphere at 1300° C. for 5 hours. Such a procedure was repeated 6 times.

(4) The shaped body treated in step (3) was further heat treated in an argon gas atmosphere at 1700° C. under a pressure of 400 kgf/cm$^2$ for 1 hour to produce a fiber reinforced silicon carbide ceramic.

The thus obtained fiber reinforced silicon carbide ceramic had a porosity of 4.5% and a flexural strength and a rupture toughness value of 900 MPa and 6.0 MPa·m$^{\frac{1}{2}}$ respectively as measured by the same methods as in Example 1, and was a fiber reinforced silicon carbide ceramic having high strength and toughness required as a heat-resistant structural material.

INDUSTRIAL APPLICABILITY

As mentioned above, the fiber reinforced silicon carbide ceramics according to the invention possess high strength and toughness because the heat-resistant inorganic short fibers are not substantially deformed or broken in the matrix; they are also three dimensionally and uniformly dispersed into the silicon carbide matrix and entangled with each other, and further, have excellent adhesion to the matrix. Therefore, the invention can provide a starting material useful as a heat-resistant structural material or a material with bio hard texture.

We claim:

1. A method of producing fiber reinforced silicon carbide composite ceramics, which comprises:
    (1) a step of wet mixing fine powder of silicon carbide with heat-resistant inorganic short fiber in order to three dimensionally and uniformly disperse the fiber and shaping the mixture to form a green shaped body;
    (2) a step of impregnating the green shaped body with a solution of silicon carbide precursor and drying it to form a preliminary shaped body; and
    (3) a step of heat treating the preliminary shaped body produced in the above step at a temperature of 800°-1700° C. to obtain a composite ceramic in which said heat-resistant inorganic short fiber is three dimensionally and uniformly dispersed in a high degree of entanglement throughout a matrix composed of said silicon carbide.

2. The method according to claim 1, wherein said preliminary shaped body is heat treated by hot pressing under a pressure in the above step (3).

3. The method according to claim 1, wherein at least a part of the impregnating, drying and heat treatments in the above steps (2) and (3) is repeated.

4. The method according to claim 1, wherein said heat-resistant inorganic short fiber is compounded into said matrix in an amount of 1~45 vol %.

5. The method according to claim 1, wherein said heat-resistant inorganic short fiber is chopped fiber selected from the group consisting of SiC, Si$_3$N$_4$, ZrO$_2$, Al$_2$O$_3$, C and 2SiO$_2$3Al$_2$O$_3$.

6. The method according to claim 1, wherein said silicon carbide precursor selected from the group consisting of polycarbosilane, polysilane and polysilastyrene.

7. A method of producing porous, fiber reinforced silicon carbide composite ceramics consisting of silicon carbide and heat-resistant inorganic short fiber, which comprises:
    (1) a step of wet mixing fine powder of silicon carbide with heat-resistant inorganic short fiber in order to three-dimensionally disperse the fiber and shaping the mixture to form a green shaped body;
    (2) a step of impregnating the green shaped body with a solution of silicon carbide precursor and drying it to form a preliminary shaped body;
    (3) a step of heat treating the preliminary shaped body produced in the above step (2) at a temperature of 800°-1700° C.; and
    (4) a step of filling in pores remaining in the shaped body with metallic silicon, at the time of the heat treatment of the above step (3) or after the heat treatment, to obtain a high density composite ceramic in which said heat-resistant inorganic short fiber is three-dimensionally and uniformly dispersed in a high degree of entanglement throughout a matrix composed of silicon carbide; and wherein metallic silicon fills in the remaining pores of the shaped body.

8. The method according to claim 7, wherein said preliminary shaped body is heat treated by hot pressing under a pressure in the above step (3).

9. The method according to claim 7, wherein at least a part of the impregnating, drying and heat treatments in the above steps (2) and (3) is repeated.

10. The method according to claim 7, wherein said heat resistant inorganic short fiber is compounded into said matrix in an amount of 1 ~ 45 vol %.

11. The method according to claim 7, wherein said heat-resistant inorganic short fiber is chopped fiber selected from the group consisting of SiC, $Si_3N_4$, $ZrO_2$, $Al_2O_3$, C and $2SiO_2 \cdot 3Al_2O_3$.

12. The method according to claim 7, wherein said silicon carbide precursor is selected from the group consisting of polycarbosilane, polysilane and polysilastyrene.

13. A porous fiber reinforced silicon carbide composite ceramic produced by the method of claim 7.

* * * * *